(12) United States Patent
Hayakawa et al.

(10) Patent No.: US 6,475,605 B2
(45) Date of Patent: Nov. 5, 2002

(54) LOW-MELTING GLASS FOR COVERING SUBSTRATE

(75) Inventors: Naoya Hayakawa, Matsusaka (JP); Kazuhiro Nishikawa, Matsusaka (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/756,101

(22) Filed: Jan. 9, 2001

(65) Prior Publication Data

US 2001/0021444 A1 Sep. 13, 2001

(30) Foreign Application Priority Data

Jan. 18, 2000 (JP) ......................................... 2000-008473
Apr. 25, 2000 (JP) ......................................... 2000-123914
Nov. 28, 2000 (JP) ......................................... 2000-360539

(51) Int. Cl.$^7$ ................................................. B32B 3/00
(52) U.S. Cl. ....................................... 428/210; 428/426
(58) Field of Search ..................... 501/73, 79; 428/411; 106/286.1, 287.34

(56) References Cited

U.S. PATENT DOCUMENTS

| 3,290,535 A | 12/1966 | Hirayama |
| 5,051,381 A | 9/1991 | Ohji |
| 5,306,674 A | * 4/1994 | Ruderer et al. ................ 501/70 |
| 5,976,236 A | * 11/1999 | Yoshihara et al. ........ 106/286.6 |

FOREIGN PATENT DOCUMENTS

| JP | 56114847 | 9/1981 |
| JP | 59-131540 | 7/1984 |
| JP | 61-242926 | 10/1986 |
| JP | 2-97435 | 4/1990 |
| JP | 2097435 | 4/1990 |
| JP | 7-291656 | 11/1995 |
| JP | 9-268026 | 10/1997 |
| JP | 2000327370 | 11/2000 |

OTHER PUBLICATIONS

Copy of Search Report.

* cited by examiner

*Primary Examiner*—Deborah Jones
*Assistant Examiner*—Gwendolyn Blackwell-Rudasill
(74) *Attorney, Agent, or Firm*—Crowell & Moring LLP

(57) ABSTRACT

A transparent, electric insulating, low-melting glass for covering a substrate includes chemical components of $SiO_2$, $B_2O_3$, BaO and ZnO. This low-melting glass has a thermal expansion coefficient of from $65 \times 10^{-7}/°$ C. to $95 \times 10^{-7}/°$ C. within a range of 30–300° C.; a softening point of not higher than 600° C.; and a dielectric constant of not greater than 7.5 at a frequency of 1 MHz under room temperature.

16 Claims, No Drawings

LOW-MELTING GLASS FOR COVERING SUBSTRATE

BACKGROUND OF THE INVENTION

The present invention relates to a transparent, electric insulating, low-melting glass for covering a substrate, particularly for covering a transparent electrode pattern or bus electrode pattern disposed on a plasma display panel (PDP) substrate. This glass serves as an electric insulating film of a PDP substrate.

Hitherto, lead-containing glass has been used as a low-melting glass for covering a substrate. Lead is an important component for making the glass have a low melting point. However, there is a recent trend to avoid the use of lead due to its adverse effect on human and environment. Furthermore, it is known to introduce an alkali metal(s) and/or bismuth component to a glass batch in order to produce a low-melting glass. However, the alkali metals tend to accumulate on the glass surface, thereby lowering electric insulation of the glass. Thus, there is a tendency to avoid such low-melting glass containing alkali metal in the field of electronics. For example, such low-melting glass may deteriorate a fluorescent material of a display panel (e.g., PDP) and may make the panel lifetime shorter. The above-mentioned bismuth component also may have an adverse effect on environment since bismuth is a heavy metal.

Japanese Patent Examined Publication JP-B-51-17027 discloses a glass for protecting a semiconductor device. This glass contains three major components of $SiO_2$, $B_2O_3$ and ZnO, but does not contain BaO.

Japanese Patent Laid-open Publication JP-A-59-131540 discloses a glass composition for making an insulating film. This glass composition contains 0.05–3.0 wt % of the total of $Li_2O$, $Na_2O$ and $K_2O$.

JP-A-61-242926 discloses a glass for bonding ferrite, containing $SiO_2$, BaO, $B_2O_3$, $Al_2O_3$ and ZnO.

JP-A-2-97435 discloses a glass sealant for a high temperature thermistor device.

Each of JP-A-7-291656 and JP-A-9-268026 discloses an insulating glass composition containing $Bi_2O_3$.

In general, it is necessary to have a sophisticated melting technique for producing phosphate-based glass, vanadium-oxide-based glass, and antimony-oxide-based glass. Furthermore, components of these glasses tend to evaporate during the melting step, thereby making these glasses unstable and colored.

SUMMARY OF THE INVENTION

It is therefore an object of the present invention to provide a low-melting glass capable of easily providing a covering film that has a thermal expansion coefficient close to that of the substrate, a low softening point, superior dielectric characteristics, a superior transparency and a superior electric insulation.

According to the present invention, there is provided a transparent, electric insulating, low-melting glass for covering a substrate. This glass comprises chemical components of $SiO_2$, $B_2O_3$, BaO and ZnO; a thermal expansion coefficient of from $65\times10^{-7}/°$ C. to $95\times10^{-7}/°$ C. within a range of 30–300° C.; a softening point of not higher than 600° C.; and a dielectric constant of not greater than 7.5 at a frequency of 1 MHz under room temperature.

DESCRIPTION OF THE PREFERRED EMBODIMENTS

A film of the low-melting glass according to the invention may directly cover the substrate (e.g., a display panel) or to cover an element disposed on the substrate. This element may be at least one of a conducting material and a semiconductor pattern, such as (a) a bus electrode pattern, for example, made of at least one of Cu and Ag, and (b) a transparent electrode pattern, for example, made of $In_2O_3$, $SnO_2$ and $In_2O_3$ doped with Sn (ITO).

It is preferable that the glass comprises 0.1–10 wt % of said $SiO_2$, 20–35 wt % of said $B_2O_3$, 25–55 wt % of said ZnO, and 15–50 wt % of a total of said BaO and RO representing at least one of MgO, CaO and SrO. Furthermore, it is preferable that the weight ratio of said BaO to the total of said BaO and said RO is 1:2 or greater.

According to one preferred embodiment of the present invention, there is provided a transparent, electric insulating, low-melting glass for covering a substrate. This glass comprises chemical components of $SiO_2$, $B_2O_3$, BaO and ZnO; a thermal expansion coefficient of from $75\times10^{-7}/°$ C. to $85\times10^{-7}/°$ C. within a range of 30–300° C.; a softening point of not higher than 600° C.; and a dielectric constant of not greater than 7 at a frequency of 1 MHz under room temperature. This glass preferably comprises 2–10 wt % of said $SiO_2$, 20–30 wt % of said $B_2O_3$, 34–43 wt % of said ZnO, and 30–37 wt % of said BaO. Furthermore, this glass is substantially free of PbO, $Bi_2O_3$ and an alkali metal oxide. This glass may further comprise not greater than 15 wt % of a component substituted for said BaO. This component is at least one of MgO, CaO and SrO.

The substrate, which is to be covered by the low-melting glass, may be a transparent glass substrate, such as a soda-lime-silica glass or a similar glass (high strain point glass) or an alumino-lime-borosilicate glass. The substrate may have a thermal expansion coefficient of from about $65\times10^{-7}/°$ C. to about $95\times10^{-7}/°$ C. within a range of 30–300° C. The low-melting glass can have a thermal expansion coefficient close to that of the substrate. With this, it becomes possible to prevent exfoliation of the film from the substrate and/or warp of the substrate. The substrate may have a softening point of from about 720 to about 840° C. In contrast with this, the low-melting glass has a softening point of not higher than 600° C. Therefore, when the film is baked, it become possible to prevent softening, deformation and thermal contraction of the substrate.

In general, an insulating film (low-melting glass) formed on a display substrate is desired to have a lower dielectric constant. In particular, a low-melting glass of PDP is desired to have a lower dielectric constant (e.g., not greater than 9) in order to reduce the electric power consumption for driving PDP. According to the invention, the dielectric constant of the low-melting glass is not greater than 7.5, preferably not greater than 7, at a frequency of 1 MHz under normal temperature (room temperature). Thus, the low-melting glass can contribute considerably to electric power saving of PDP.

As stated above, the low-melting glass comprises chemical components of $SiO_2$, $B_2O_3$, BaO and ZnO such that the glass can be adjusted to having the above-mentioned numerical ranges of thermal expansion coefficient, softening point and dielectric constant. It is preferable that said glass is substantially free of each of PbO and $Bi_2O_3$. With this, the adverse impact of the low-melting glass on human and environment can substantially reduced. It is also preferable that the glass is substantially free of alkali metal oxide. With this, the film of the low-melting glass becomes superior in electric insulation. Furthermore, it becomes possible to prevent damage caused by the alkali accumulation on the surface of the film.

As mentioned above, it is possible to directly cover a substrate with the film of the low-melting glass, for example, in order to prevent alkali migration from an alkali-containing glass substrate or to alter optical characteristics of the substrate. Furthermore, it is possible to form at least one of various functional films on the film of the low-melting glass. It is possible to prepare a frosted glass for reducing glare of the solar radiation and artificial illumination, by mixing a low-melting glass powder with a silica fine powder, an alumina fine powder and/or the like and by forming a film from the resulting mixture on a glass substrate.

The description of chemical components of the low-melting glass is as follows. $SiO_2$ is a glass forming component. It is possible to make a stable glass even with a small amount of $SiO_2$, if it is coexistent with another glass forming component of $B_2O_3$. The $SiO_2$ content of the glass is preferably 0.1–10 wt %. If it is less than 0.1 wt %, the glass may become unstable. If it is greater than 10 wt %, the softening point of the glass may become too high, making formability and workability difficult. A PDP can be prepared by forming an insulating film to cover an electrode pattern and then by removing a portion of the insulating film with acid to expose a portion of the electrode pattern. If the $SiO_2$ content of the glass is excessive, the glass may become too high in acid resistance. Thus, it is more preferably not greater than 5 wt % in order to smoothly decompose the film with acid. It is more preferably not less than 2 wt % in order to make the glass more stable. It is optional to replace half or less by weight of $SiO_2$ with $Al_2O_3$ to an extent that the $Al_2O_3$ content of the glass is not greater than 1 wt %.

Of the chemical components of the glass, $B_2O_3$ is a glass forming component similar to $SiO_2$. $B_2O_3$ makes it easy to melt the glass, suppresses the excessive increase of the thermal expansion coefficient of the glass, and provides the glass with a suitable fluidity upon baking. Furthermore, $B_2O_3$, together with $SiO_2$, serves to lower the dielectric constant of the glass. The $B_2O_3$ content of the glass is preferably 20–35 wt %, more preferably 22–30 wt %. If it is less than 20 wt %, the glass may become unstable. Thus, devitrification tends to occur. If it exceeds 35 wt %, the softening point of the glass may become too high.

ZnO has functions of lowering the softening point of the glass, providing the glass with a suitable fluidity and adjusting the glass to having a suitable thermal expansion coefficient. The ZnO content of the glass is preferably 25–55 wt %, more preferably 34–54 wt %. If it is less than 25 wt %, these functions may become insufficient. If it is greater than 55 wt %, the glass may become unstable. Thus, devitrification tends to occur.

Similar to ZnO, BaO also has functions of lowering the softening point of the glass, providing the glass with a suitable fluidity and adjusting the glass to having a suitable thermal expansion coefficient. Similar bivalent metal oxides, MgO, CaO and SrO, also have functions of providing the glass with a suitable fluidity and adjusting the glass to having a suitable thermal expansion coefficient. The glass preferably comprises 15–50 wt % of the total of BaO and RO representing at least one of MgO, CaO and SrO. If it is less than 15 wt %, the above functions may become insufficient. If it is greater than 50 wt %, the thermal expansion coefficient may become too high. The weight ratio of BaO to the total of BaO and RO is preferably 1:2 or greater. If this ratio is less than 1:2, devitrification tends to occur, or the softening point may become too high, or the thermal expansion coefficient may deviate from a suitable range. The BaO content of the glass is preferably 16–35 wt %.

The glass may contain PbO, $Bi_2O_3$ and alkali metal oxide as impurities, so long as the amounts of these impurities are each not greater than 0.3 wt %. With this, the above-mentioned adverse effects on human, environment and insulating property can be negligible.

In case of directly cover a substrate with a film of the low-melting glass, the glass may contain additives of $Fe_2O_3$, $Cr_2O_3$, CoO and $CeO_2$ and the like for providing the glass with a certain color, ultraviolet absorption capability, infrared shielding capability and the like, so long as these additives do not interfere with the glass to have the above-mentioned thermal expansion coefficient, softening point and dielectric constant. The total of the above additives is preferably not greater than 1 wt %.

In case that the film of the low-melting glass covers a transparent electrode pattern that is made of an oxide (e.g., at least one of $In_2O_3$, $SnO_2$ and $In_2O_3$ doped with Sn (ITO)) and disposed on a substrate of a display panel (e.g., PDP), it is preferable that the low-melting glass also contains 0.5–5 wt % of this oxide so long as the oxide does not interfere with the glass to have the above-mentioned thermal expansion coefficient, softening point and dielectric constant. Similarly, in case that the film covers a bus electrode pattern that is made of a metal (e.g., at least one of Cu and Ag) and disposed on a substrate of a display panel (e.g., PDP), it is preferable that the low-melting glass also contains 0.1–1.5 wt % of an oxide (e.g., at least one of CuO and $Ag_2O$) of this metal. Due to the above containment of at least one of these oxides, it becomes possible to effectively suppress both of (1) a first corrosion of the low-melting glass by the transparent electrode pattern and/or the bus electrode pattern and (2) a second corrosion of the transparent electrode pattern and/or the bus electrode pattern by the low-melting glass. In particular, if the low-melting glass contains 0.1–1.5 wt % of CuO, the low-melting glass is provided with an advantageous filter function that makes blue color of PDP clearer. In fact, PDP is generally inferior in blue color emission. Therefore, the containment of a suitable amount of CuO is particularly preferable. If the amount of at least one of the above oxides is too much, the low-melting glass may have inferior thermal characteristics and an undesirable color.

An exemplary process for producing a front substrate of a PDP will be described as follows. This front substrate is made of a clear soda-lime glass or another glass having a chemical composition, thermal characteristics and the like similar to those of clear soda-lime glass. A transparent electrode pattern, for example, made of an ITO-based or $SnO_2$-based material is formed on a surface of the front substrate by sputtering or chemical vapor deposition (CVD). Furthermore, a bus electrode pattern, for example, made of Cu-based material is formed on the front substrate by sputtering or the like in a manner to be in contact with the transparent electrode pattern. Then, a transparent insulating film made of a low-melting glass according to the invention is formed on the surface of the front substrate in a manner to cover the front substrate, the transparent electrode pattern and the bus electrode pattern. In fact, this insulating film is prepared by mixing a low-melting glass powder, which has been adjusted to having a certain desired particle size, with a paste oil, then by applying the resulting mixture onto the front substrate, the transparent electrode pattern and the bus electrode pattern by screen printing or the like, and then by baking the resulting precursory film at about 600° C. into an insulating film having a thickness of about 30 $\mu$m. This thickness of about 30 $\mu$m is considered to be a sufficient thickness to achieve display capability and display stability for a long time by gas discharge. Furthermore, a protective magnesia layer is formed on the insulating film by sputtering or the like, thereby completing the production of a PDP front substrate. In some cases, there is a necessity to remove a portion of the insulating film by applying an acid for exposing and connecting a portion of the electrode with an outside lead wire. In these cases, the insulating film preferably has a suitable acid solubility.

EXAMPLES 1–7 & COMPARATIVE EXAMPLES 1–4

In each of these examples, a paste of a low-melting glass powder was prepared as follows. At first, raw materials of a low-melting glass powder were mixed together. The resulting mixture was put into a platinum crucible and then heated in an electric furnace at a temperature of 1,000–1,100° C. for 1–2 hr, thereby obtaining a glass composition shown in Tables 1–2. In fact, a fine silica sand powder, boric acid, aluminum oxide, zinc white, barium carbonate, magnesium carbonate, calcium carbonate, strontium carbonate, bismuth oxide, lithium carbonate, sodium carbonate, potassium carbonate, and red lead were respectively used as raw materials of $SiO_2$, $B_2O_3$, $Al_2O_3$, ZnO, BaO, MgO, CaO, SrO, $Bi_2O_3$, $Li_2O$, $Na_2O$, $K_2O$ and PbO of the glass composition. A portion of the obtained glass composition was poured into a mold, and then the resulting glass block was used for the measurement of its thermal characteristics (thermal expansion coefficient and softening point). The rest of the obtained glass composition was formed into flakes by a rapid-cooling, dual-roller, forming machine, and then formed by a crushing machine into a glass powder having an average particle size of 2–4 μm and a maximum particle size of less than 15 μm. The obtained glass powder and a binder (ethyl cellulose) were mixed with a paste oil composed of α-terpineol and butyl carbitolacetate into a paste having a viscosity of about 300±50 poises, which is suitable for screen printing.

Separately, an ITO pattern film was formed by sputtering on a soda-lime glass substrate having a thickness of 2–3 mm and widths of 150 mm. Then, the above-obtained paste was applied to the glass substrate and the ITO pattern film by screen printing using a screen having a mesh opening of #250 in a manner to adjust an insulating film obtained by the following baking to having a thickness of about 30 μm. The resulting precursory film of the paste was baked at 600° C. for 40 min, thereby forming an insulating film having a thickness of about 30 μm.

The glass block of the low-melting glass was subjected to a measurement of thermal expansion coefficient, as follows. At first, the glass block was cut and ground into a test sample. This test sample was set on a thermal expansion tester. Then, the temperature of the test sample was increased at a rate of 5° C. per minute in order to measure elongation of the test sample. Based on this, the average thermal expansion coefficient of the test sample within a range of 30–300° C. was determined in terms of $\alpha \times 10^{-7}/°$ C. The results are shown in Tables 1–2. For example, the result of Example 1 was $84 \times 10^{-7}/°$ C., as shown in Table 1. It is preferable that the low-melting glass has a thermal expansion coefficient close to that of its substrate in contact with the low-melting glass. Thus, the thermal expansion coefficient of the low-melting glass is preferably from $65 \times 10^{-7}/°$ C. to $95 \times 10^{-7}/°$ C.

The glass block of the low-melting glass was formed by heating into a glass beam having a predetermined size. This glass beam was set on a Lyttelton viscometer. Then, the temperature of the glass beam was increased, and its softening point, that is, a temperature at which viscosity coefficient (η) reached $10^{7.6}$ was measured. The results are shown in Tables 1–2.

The coated glass substrate having the glass substrate (thickness: 3 mm; visible light transmittance: 86%) coated with the ITO film and the insulating film was subjected to a transmittance measurement with a spectrophotometer to determine the average transmittance in the visible region. The results are shown in Tables 1–2. It is preferable that the coated glass substrate has a visible light transmittance of 75% or greater.

A glass body of the low-melting glass was ground into a disk having a thickness of 1.0 mm and a diameter of 50 mm. Then, electrodes were formed on both major surfaces of the disk. Then, the dielectric constant of the disk at a frequency of 1 MHz at 25° C. was measured by a known guard ring method (alternating current bridge method). The dielectric constant is preferably not greater than 7.5, more preferably not greater than 7.

A glass body of the low-melting glass of Example 4 was subjected to a volume resistivity measurement by a direct current, three-terminal method at 250° C. with an applied voltage of 500V. The result is shown in Table 1. The volume resistivity is preferably from $10^{13}$ to $10^{15}$ Ωcm.

The coated glass substrate having the ITO film and the insulating film was subjected to an acid solubility test. In this test, the coated glass substrate was immersed in 7% nitric acid aqueous solution in order to remove the insulating film. It was judged as "A" if the insulating film was completely removed within 5 minutes. It was judged as "B" if the insulating film was almost removed. It was judged as "C" if the insulating film was not removed. The results are shown in Tables 1–2.

After the removal of the insulating film from the coated glass substrate, the electric resistance of the ITO film was measured by a four probe method. This ITO film resistance divided by the ITO film resistance measured prior to the insulating film formation thereon was determined as "ITO resistance increase rate". The results are shown in Tables 1–2. It should be noted that the ITO film resistance increases, if the insulating film is formed on the ITO film, due to the mutual corrosion of the ITO film and the insulating film. The ITO resistance increase rate is preferably not greater than 250%.

TABLE 1

|  | Ex. 1 | Ex. 2 | Ex. 3 | Ex. 4 | Ex. 5 | Ex. 6 | Ex. 7 |
|---|---|---|---|---|---|---|---|
| Glass Composition (%) | | | | | | | |
| $SiO_2$ | 3.4 | 3.5 | 3.5 | 3.1 | 3.3 | 2.9 | 1.8 |
| $B_2O_3$ | 23.4 | 24.6 | 24.2 | 28.6 | 22.9 | 26.8 | 23.3 |
| ZnO | 36.5 | 38.3 | 42.5 | 34.3 | 40.2 | 53.7 | 28.2 |

TABLE 1-continued

|  | Ex. 1 | Ex. 2 | Ex. 3 | Ex. 4 | Ex. 5 | Ex. 6 | Ex. 7 |
|---|---|---|---|---|---|---|---|
| BaO | 34.4 | 27.0 | 17.8 | 34.0 | 33.6 | 16.6 | 46.7 |
| MgO | 2.3 | — | — | — | — | — | — |
| CaO | — | 6.6 | — | — | — | — | — |
| SrO | — | — | 12.0 | — | — | — | — |
| Thermal Expansion Coefficient ($\alpha$) | 84 | 83 | 79 | 77 | 83 | 65 | 95 |
| Transition Point (° C.) | 503 | 494 | 508 | 507 | 498 | — | — |
| Softening Point (° C.) | 591 | 596 | 598 | 597 | 586 | 583 | 566 |
| Volume Resistivity ($\Omega$ cm) | — | — | — | $1.3 \times 10^{14}$ | — | — | — |
| Dielectric Constant | 6.8 | 6.9 | 6.8 | 6.8 | 6.9 | 6.6 | 7.5 |
| Visible Light Transmittance (%) | 77 | 76 | 76 | 76 | 77 | 77 | 80. |
| Acid Solubility | A | A | A | A | A | A | A |
| ITO Resistance Increase Rate (%) | 220 | 210 | 210 | 210 | 230 | 200 | 180 |

TABLE 2

|  | Com. Ex.1 | Com. Ex.2 | Com. Ex.3 | Com. Ex.4 |
|---|---|---|---|---|
| Glass Composition (%) | | | | |
| $SiO_2$ | 2.0 | 6.8 | 28.0 | 25.0 |
| $B_2O_3$ | 18.0 | 35.2 | 3.0 | 10.0 |
| $Al_2O_3$ | — | 0.9 | — | — |
| ZnO | 6.0 | 43.1 | 3.0 | — |
| BaO | 11.0 | — | — | — |
| MgO | — | — | — | — |
| CaO | 3.0 | — | — | — |
| SrO | — | — | — | — |
| $Bi_2O_3$ | 60.0 | — | — | — |
| $Li_2O$ | — | 3.0 | — | — |
| $Na_2O$ | — | 10.0 | — | — |
| $K_2O$ | — | 1.0 | — | — |
| PbO | — | — | 66.0 | 65.0 |
| Thermal Expansion Coefficient ($\alpha$) | 80 | 70 | 75 | 75 |
| Transition Point (° C.) | 504 | — | — | — |
| Softening Point (° C.) | 570 | 515 | 567 | 560 |
| Dielectric Constant | 11.7 | 7.0 | 9.0 | 8.5 |
| Visible Light Transmittance (%) | 70 | 78 | 78 | 79 |
| Acid Solubility | A | A | C | B |
| ITO Resistance Increase Rate (%) | 300 | 400 | 250 | 300 |

EXAMPLE 8

In this example, Example 7 was repeated except that 1.0 wt % of $B_2O_3$ was replaced with 1.0 wt % of $In_2O_3$ and 0.5 wt % of $B_2O_3$ was replaced with 0.5 wt % of CuO. In other words, the $B_2O_3$ content of the glass composition of Example 8 was 21.8 wt %. The same evaluation tests were conducted. The thermal expansion coefficient was $95 \times 10^{-7}/°$ C. The softening point was 568° C. The dielectric constant was 7.2. The visible light transmittance was 75%. The acid solubility was judged as "A". The ITO resistance increase rate was not greater than 150%. The coated glass substrate was provided with pale blue color by the CuO inclusion. Due to this, the blue color of PDP is made clearer.

The entire disclosure of Japanese Patent Application Nos. 2000-008473 filed on Jan. 18, 2000, 2000-123914 filed on Apr. 25, 2000 and 2000-360539 filed on Nov. 28, 2000, including specification, claims and summary, is incorporated herein by reference in its entirety.

What is claimed is:

1. A transparent, electric insulating, low-melting glass for covering a substrate, said glass comprising:
   $SiO_2$, $B_2O_3$, BaO and ZnO; and
   having a thermal expansion coefficient of from $65 \times 10^{-7}/°$ C. to $95 \times 10^{-7}/°$ C. within a range of 30–300° C.;
   having a softening point of not higher than 600° C.; and
   having a dielectric constant of not greater than 7.5 at a frequency of 1 MHz under room temperature,
   wherein said glass comprises 20–35 wt % of said $B_2O_3$ and 16–35 wt % of said BaO.

2. A glass according to claim 1, wherein said glass comprises 0.1–10 wt % of said $SiO_2$, 25–55 wt % of said ZnO, and RO, wherein RO represents at least one of MgO, CaO and SrO, and wherein said glass is substantially free of PbO, $Bi_2O_3$ and alkali metal oxide.

3. A glass according to claim 2, wherein a weight ratio of said BaO to the total of said BaO and said RO is 1:2 or greater.

4. A glass according to claim 2, wherein said glass comprises 2–5 wt % of said $SiO_2$, 22–30 wt % of said $B_2O_3$, and 34–54 wt % of said ZnO.

5. A glass according to claim 1, which directly covers the substrate or covers an element disposed on the substrate, said element comprising at least one of a conducting material and a semiconductor pattern.

6. A glass according to claim 2, which covers an element disposed on the substrate that is used for a display panel, said element comprising at least one of a transparent electrode pattern and a bus electrode pattern.

7. A transparent, electric insulating, low-melting glass for covering a substrate, said glass comprising:
   $SiO_2$, $B_2O_3$, BaO and ZnO, said glass includes 0.1–10 wt % of said $SiO_2$, 20–35 wt % of said $B_2O_3$, 25–55 wt % of said ZnO and 15–50 wt % of a total of said BaO and RO, wherein RO represents at least one of MgO, CaO and SrO, said glass being substantially free of PbO, $Bi_2O_3$ and alkali metal oxide; and
   having a thermal expansion coefficient of from $65 \times 10^{-7}/°$ C. to $95 \times 10^{-7}/°$ C. within a range of 30–300° C.;
   having a softening point of not higher than 600° C.; and
   having a dielectric constant of not greater than 7.5 at a frequency of 1 MHz under room temperature,
   wherein said glass covers an element disposed on the substrate that is used for a display panel, said element comprising at least one of a transparent electrode pattern made of an oxide and a bus electrode pattern, and further wherein, when said element comprises said transparent electrode pattern, said glass also comprises 0.5–5 wt % of said oxide.

8. A glass according to claim 7, wherein said oxide is at least one selected from the group consisting of $In_2O_3$, $SnO_2$, and $In_2O_3$ doped with Sn (ITO).

9. A transparent, electric insulating, low-melting glass for covering a substrate, said glass comprising:

$SiO_2$, $B_2O_3$, BaO and ZnO, said includes 0.1–10 wt % of said $SiO_2$, 20–35 wt % of said $B_2O_3$, 25–55 wt % of said ZnO and 15–50 wt % of a total of said BaO and RO, wherein RO represents at least one of MgO, CaO and SrO, said glass being substantially free of PbO, $Bi_2O_3$ and alkali metal oxide; and having a thermal expansion coefficient of from $65 \times 10^{-7}/°$ C. to $95 \times 10^{-7}/°$ C. within a range of 30–300° C.;

having a softening point of not higher than 600° C.; and having a dielectric constant of not greater than 7.5 at a frequency of 1 MHz under room temperature, wherein said glass covers an element disposed on the substrate that is used for a display panel, said element comprising at least one of a transparent electrode pattern and a bus electrode pattern made of metal, and further wherein, when said element comprises said bus electrode pattern, said glass also comprises 0.1–1.5 wt % of an oxide of said metal.

10. A glass according to claim 9, wherein said oxide is at least one selected from the group consisting of CuO and $Ag_2O$.

11. A transparent, electric insulating, low-melting glass for covering a substrate, said glass comprising:

$SiO_2$, $B_2O_3$, BaO and ZnO, said glass includes 0.1–10 wt % of said $SiO_2$, 20–35 wt % of said $B_2O_3$, 25–55 wt % of a total of said ZnO and 15–50 wt % of a total of said BaO and RO, wherein RO represents at least one of MgO, CaO and SrO, said glass being substantially free of PbO, $Bi_2O_3$ and alkali metal oxide; and having a thermal expansion coefficient of from $65 \times 10^{-7}/°$ C. to $95 \times 10^{-7}/°$ C. within a range of 30–300° C.;

having a softening point of not higher than 600° C.; and having a dielectric constant of not greater than 7.5 at a frequency of 1 MHz under room temperature, wherein said glass covers an element disposed on the substrate that is used for a display panel, said element comprising at least one of a transparent electrode pattern made of an oxide and a bus electrode pattern made of a metal, and further wherein, when said element comprises said transparent electrode pattern, and said bus electrode pattern said glass also comprises 0.5–5 wt % of said oxide and 0.1–1.5 wt % of an oxide of said metal.

12. A transparent, electric insulating, low-melting glass for covering a substrate, said glass comprising:

$SiO_2$, $B_2O_3$, BaO and ZnO; and having a thermal expansion coefficient of from $75 \times 10^{-7}/°$ C. to $85 \times 10^{-7}/°$ C. within a range of 30–300° C.;

having a softening point of not higher than 600° C.; and having a dielectric constant of not greater than 7 at a frequency of 1 MHz under room temperature, wherein said glass comprises 20–30 wt % of said $B_2O_3$, 34–43 wt % of said ZnO, and 30–37 wt % of said BaO.

13. A glass according to claim 12, wherein said glass comprises 2–10 wt % of said $SiO_2$, and wherein said glass is substantially free of PbO, $Bi_2O_3$ and alkali metal oxide.

14. A glass according to claim 13, wherein said glass further comprises not greater than 15 wt % of a component substituted for said BaO, said component being at least one selected from the group consisting of MgO, CaO and SrO.

15. A laminate comprising:

(a) a substrate; and (b) a film covering said substrate, said film comprising a transparent, electric insulating, low-melting glass, said glass comprising:

(1) $SiO_2$, $B_2O_3$, BaO and ZnO; and (2) having a thermal expansion coefficient of from $65 \times 10^{-7}/°$ C. to $95 \times 10^{-7}/°$ C. within a range of 30–300° C.;

(3) having a softening point of not higher than 600° C.; and (4) having a dielectric constant of not greater than 7.5 at a frequency of 1 MHz under room temperature, wherein said glass comprises 20–35 wt % of said $B_2O_3$ and 16–35 wt % of said BaO.

16. A laminate according to claim 15, wherein said substrate is a transparent glass plate having (a) a thermal expansion coefficient of from about $65 \times 10^{-7}/°$ C. to about $95 \times 10^{-7}/°$ C. within a range of 30–300° C. and (b) a softening point of from about 720 to about 840° C.

* * * * *